US010323852B2

(12) United States Patent
Takanaga et al.

(10) Patent No.: US 10,323,852 B2
(45) Date of Patent: Jun. 18, 2019

(54) VEHICLE SHUTTER

(71) Applicants: MAZDA MOTOR CORPORATION, Aki-gun, Hiroshima (JP); STARLITE CO., LTD., Osaka-shi (JP)

(72) Inventors: Yuhki Takanaga, Aki-gun (JP); Kazuma Kondou, Aki-gun (JP); Manabu Yamaoka, Aki-gun (JP); Yoshimitsu Hayamizu, Hiroshima (JP); Naoya Takashima, Hiroshima (JP)

(73) Assignees: MAZDA MOTOR CORPORATION, Aki-gun (JP); STARLITE CO., LTD., Osaka-shi (JP)

( * ) Notice: Subject to any disclaimer, the term of this patent is extended or adjusted under 35 U.S.C. 154(b) by 864 days.

(21) Appl. No.: 14/276,271

(22) Filed: May 13, 2014

(65) Prior Publication Data

US 2014/0335778 A1 Nov. 13, 2014

(30) Foreign Application Priority Data

May 13, 2013 (JP) .................................. 2013-101545

(51) Int. Cl.
*F24F 7/00* (2006.01)
*B60K 11/08* (2006.01)

(52) U.S. Cl.
CPC .............. *F24F 7/00* (2013.01); *B60K 11/085* (2013.01); *Y02T 10/88* (2013.01)

(58) Field of Classification Search
CPC ................................. F24F 7/00; B60K 11/085
USPC ........................................................ 454/33
See application file for complete search history.

(56) References Cited

U.S. PATENT DOCUMENTS 7,335,096 B2 * 2/2008 Perez ..................... E04B 7/163
454/358
9,764,621 B2 * 9/2017 Sakaguchi ........... B60H 1/3421

FOREIGN PATENT DOCUMENTS

JP 2012-197001 A1 10/2012

* cited by examiner

*Primary Examiner* — Helena Kosanovic
(74) *Attorney, Agent, or Firm* — Kratz, Quintos & Hanson, LLP

(57) ABSTRACT

Provided is a vehicle shutter capable of detecting a flap to which power transmission is cut off by providing turn restriction units each having a simple structure in flaps. The vehicle shutter is provided with: a plurality of flaps 13 capable of opening and closing an outside air introduction path 8 for introducing outside air into an engine compartment and arranged in parallel to each other so as to cross the outside air introduction path 8; a linkage operation section linking the flaps 13 with each other to perform an opening/closing operation of the flaps; a drive section driving the flaps 13 to be open and closed through the linkage operation section; an abnormality detection section detecting an abnormality of the flaps 13 on the basis of an operating state of the drive section; and an abnormality notification section notifying the abnormality to a user on the basis of output from the abnormality detection section. Opening failure detecting restriction units 13*j* and closing failure detecting restriction units 13*k* are formed on adjacent flaps 13 as turn restriction units which restrict, when power transmission to one of the adjacent flaps 13 from the drive section is cut off, the other flap 13 from turning.

6 Claims, 12 Drawing Sheets

[Fig. 1]
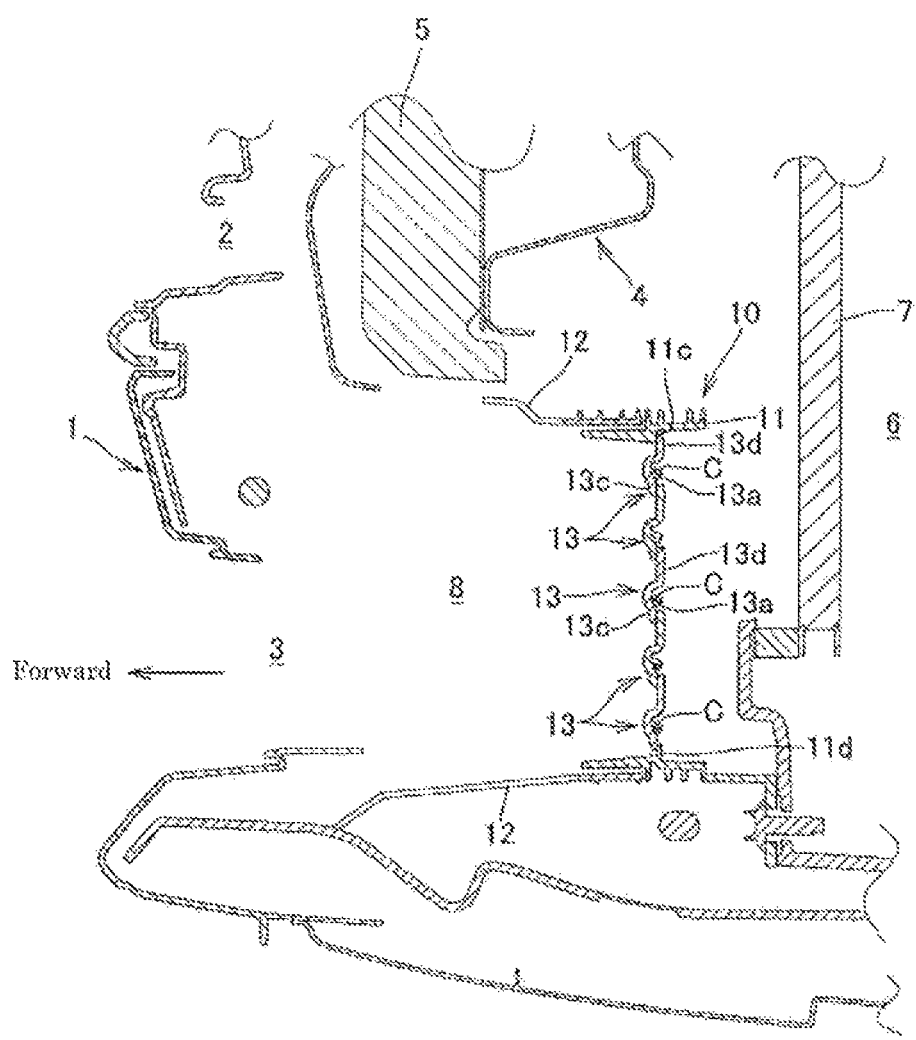

[Fig. 2]
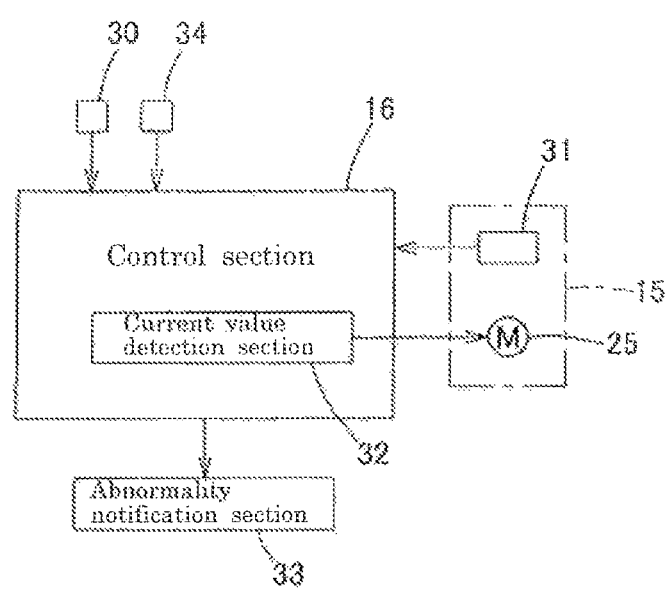

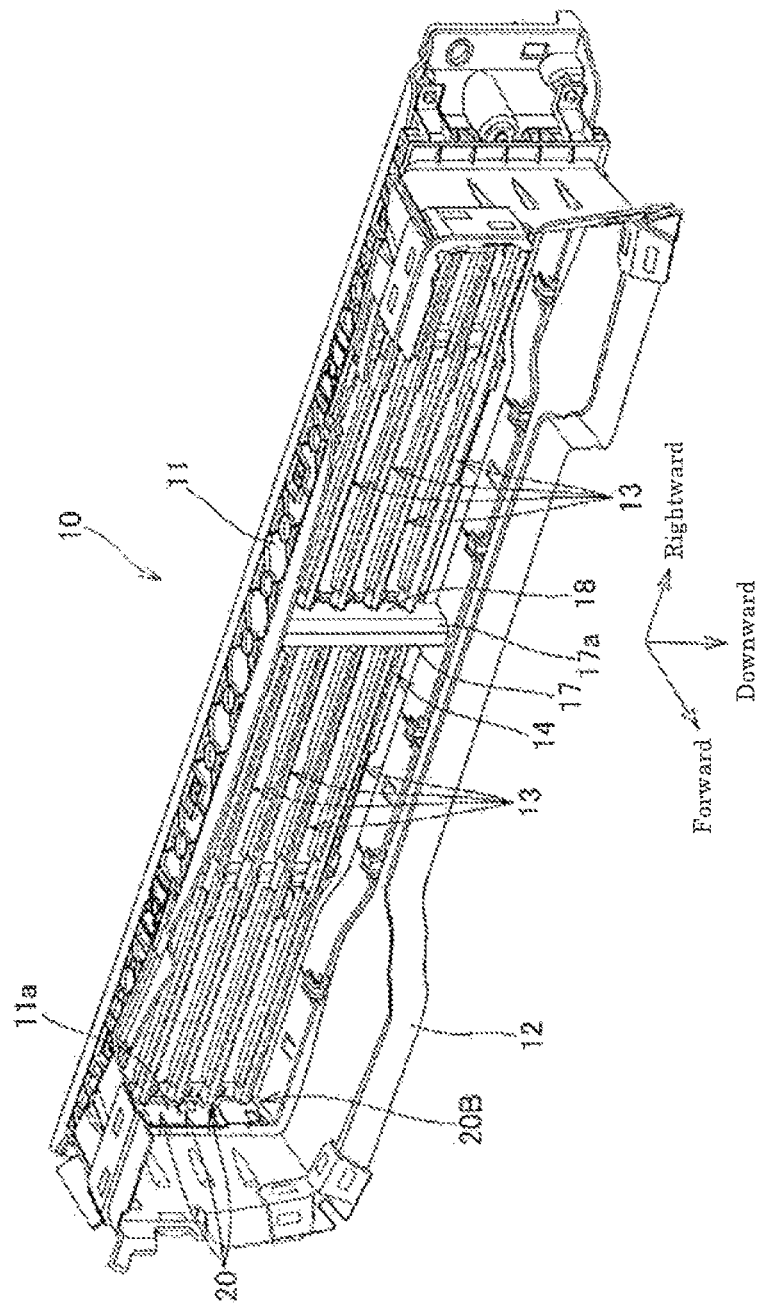

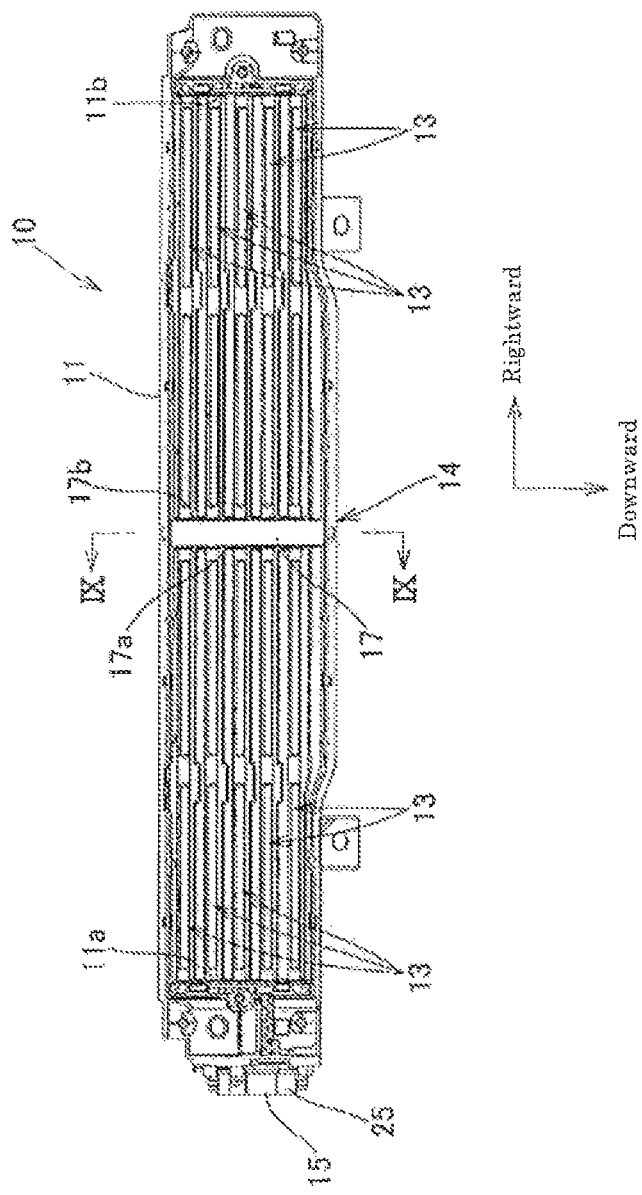
[Fig. 4]

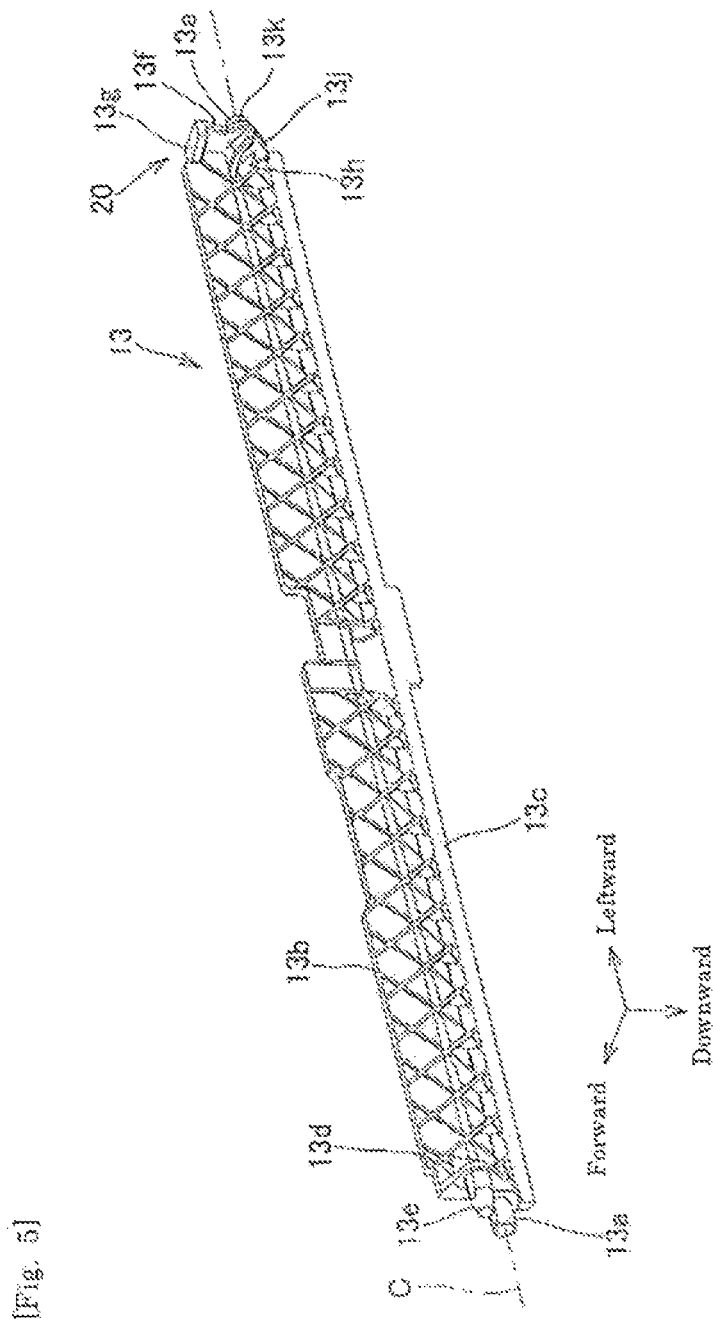

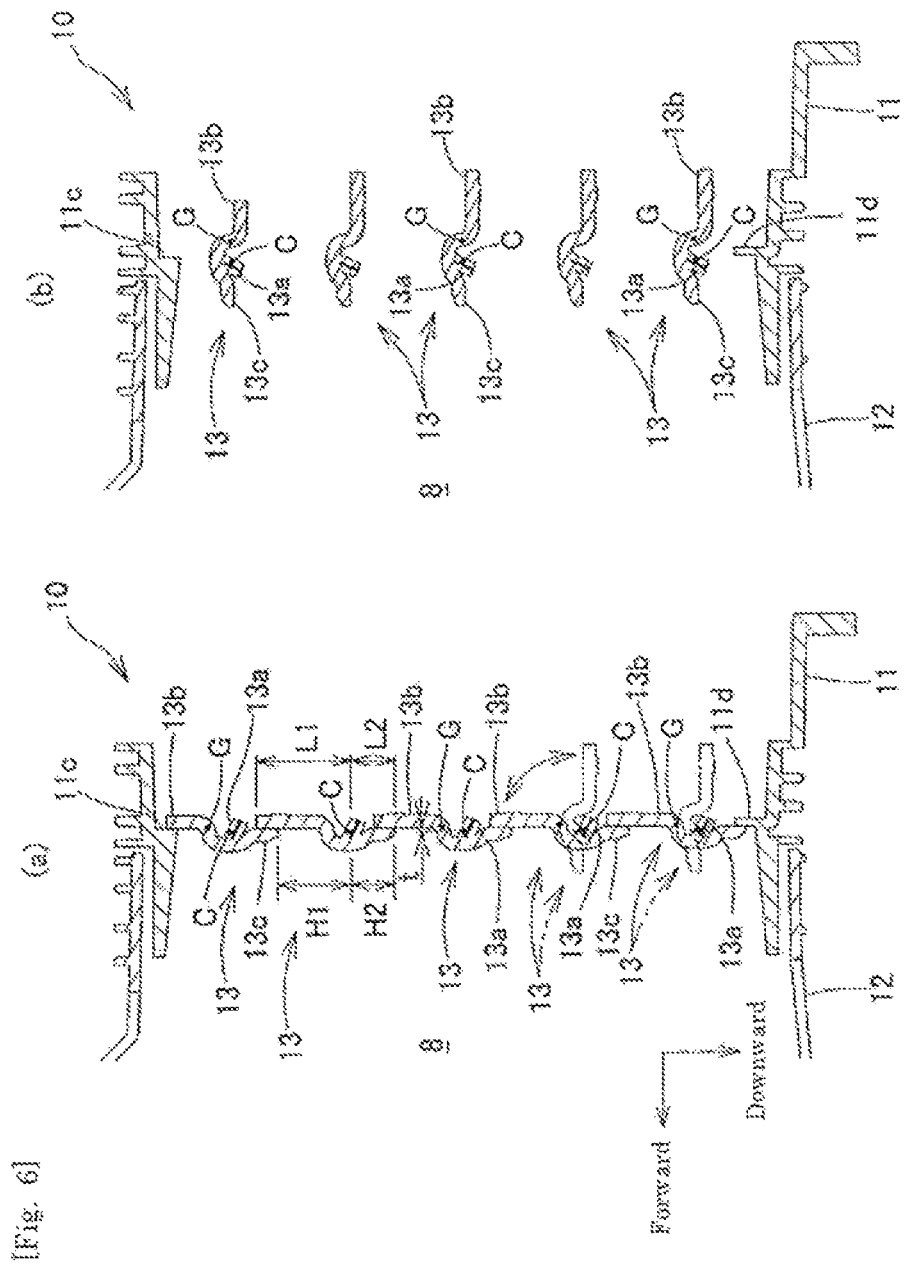

[Fig. 7]
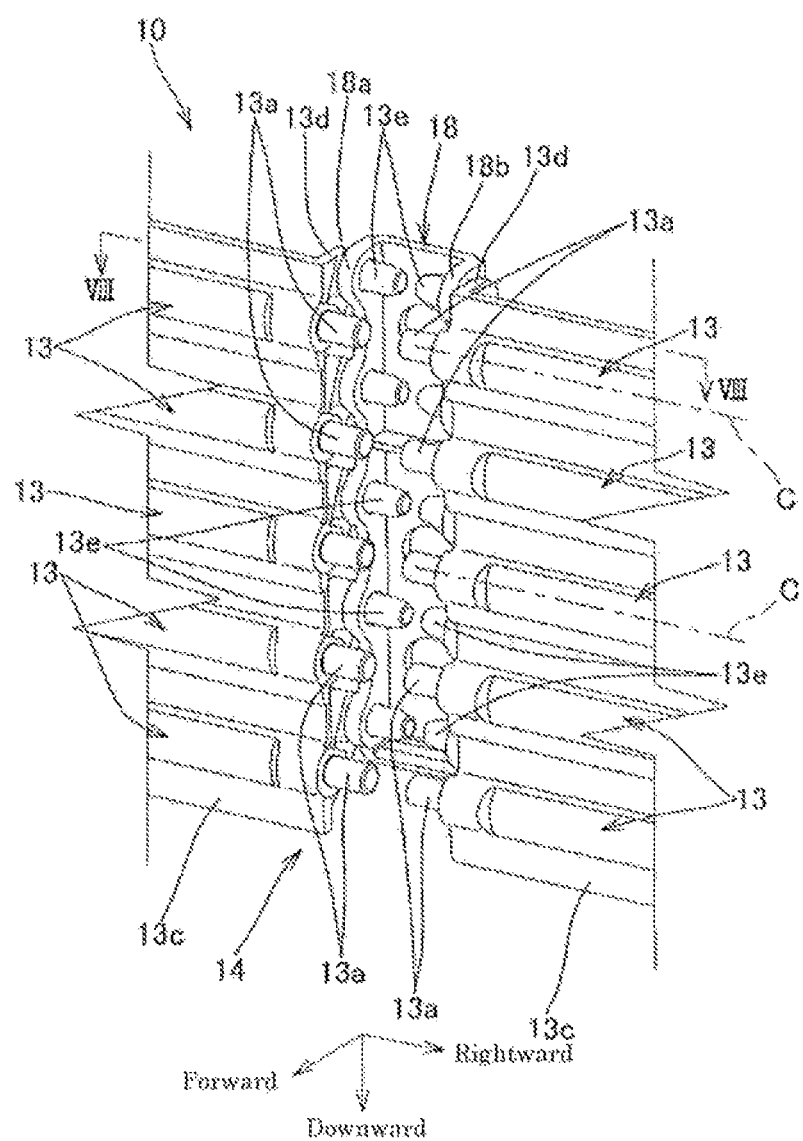

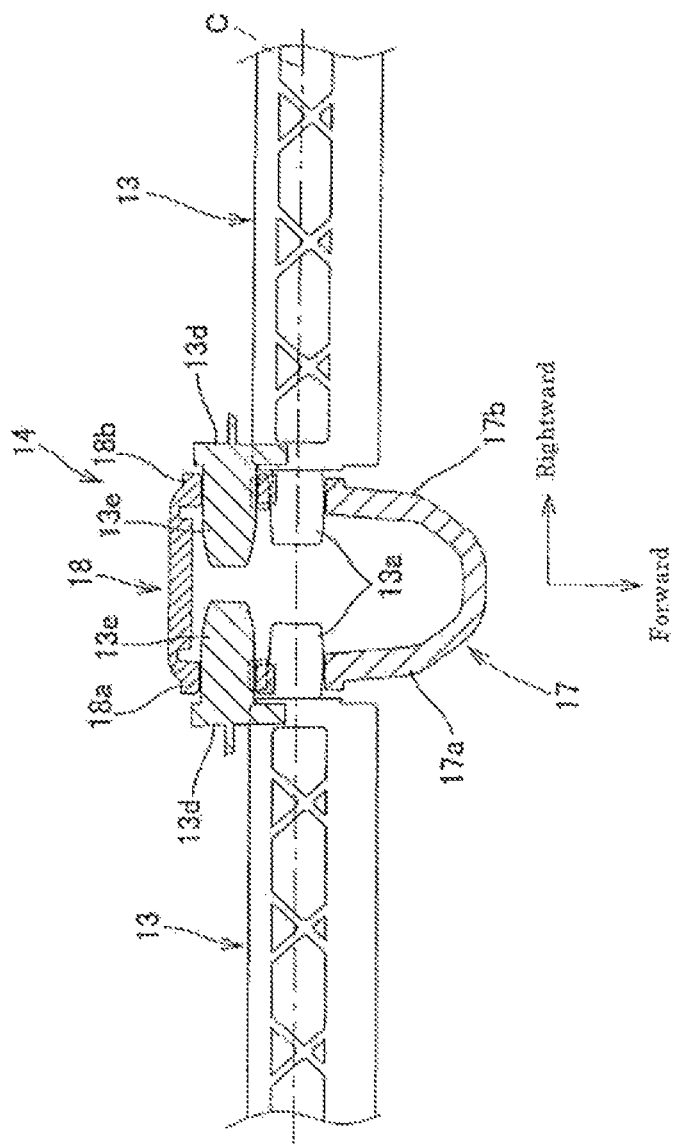

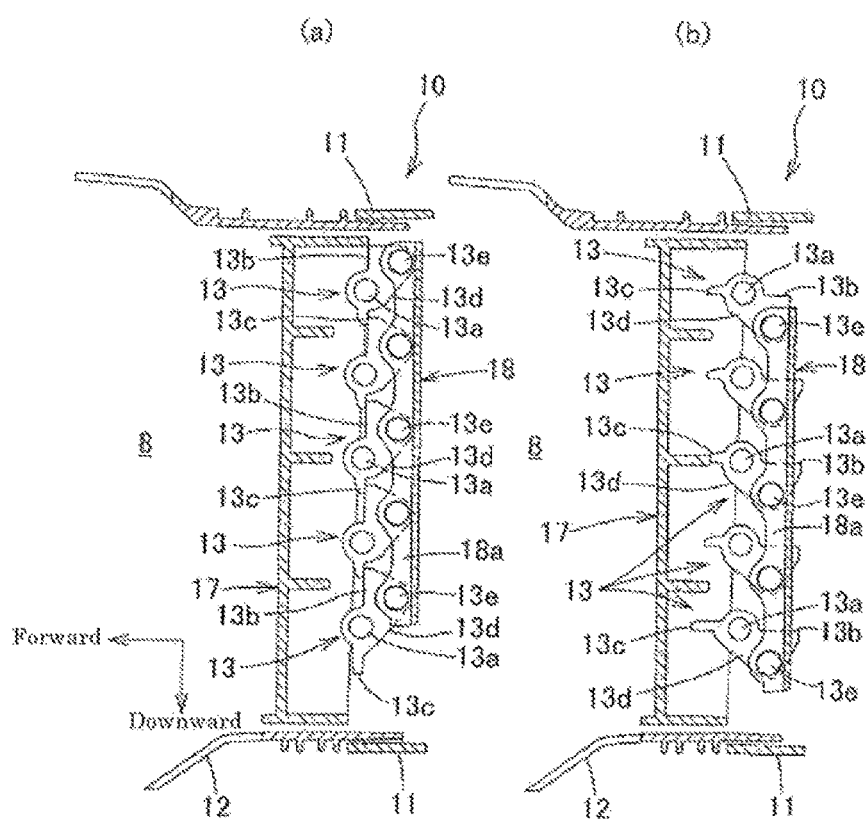

[Fig. 10]
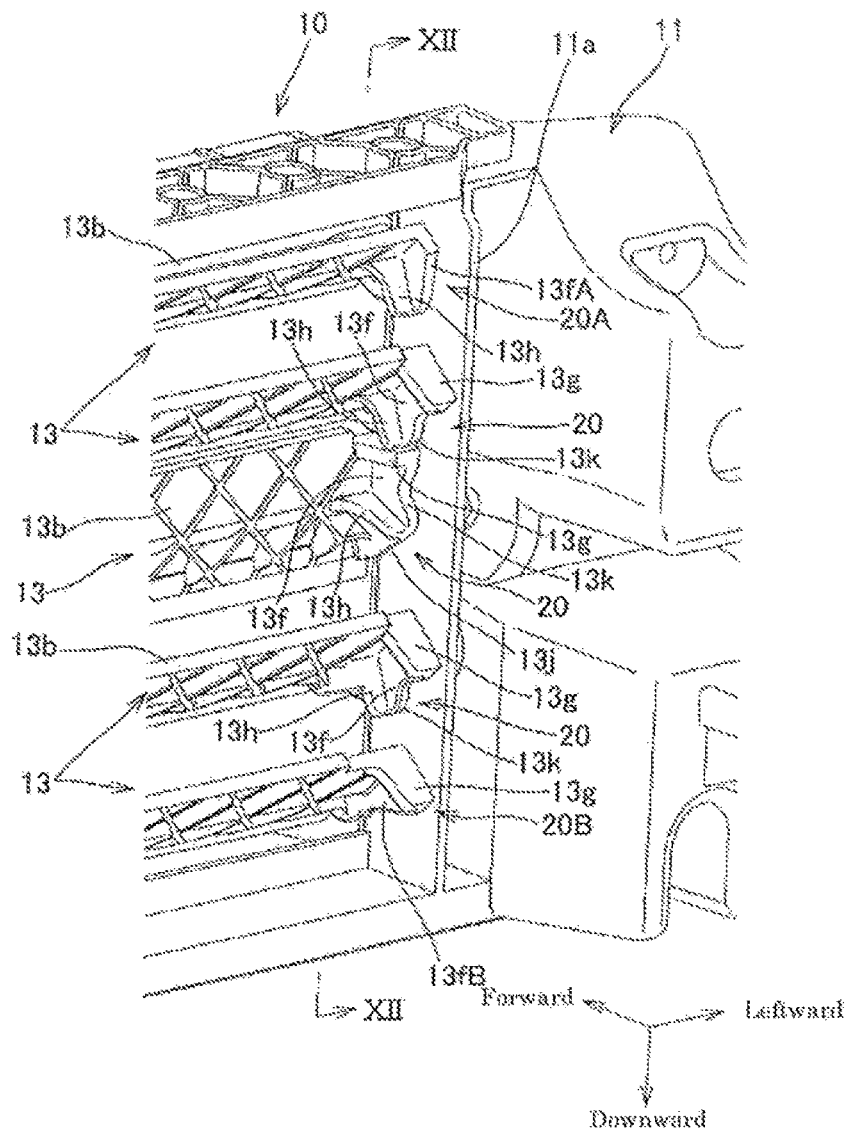

[Fig. 11]
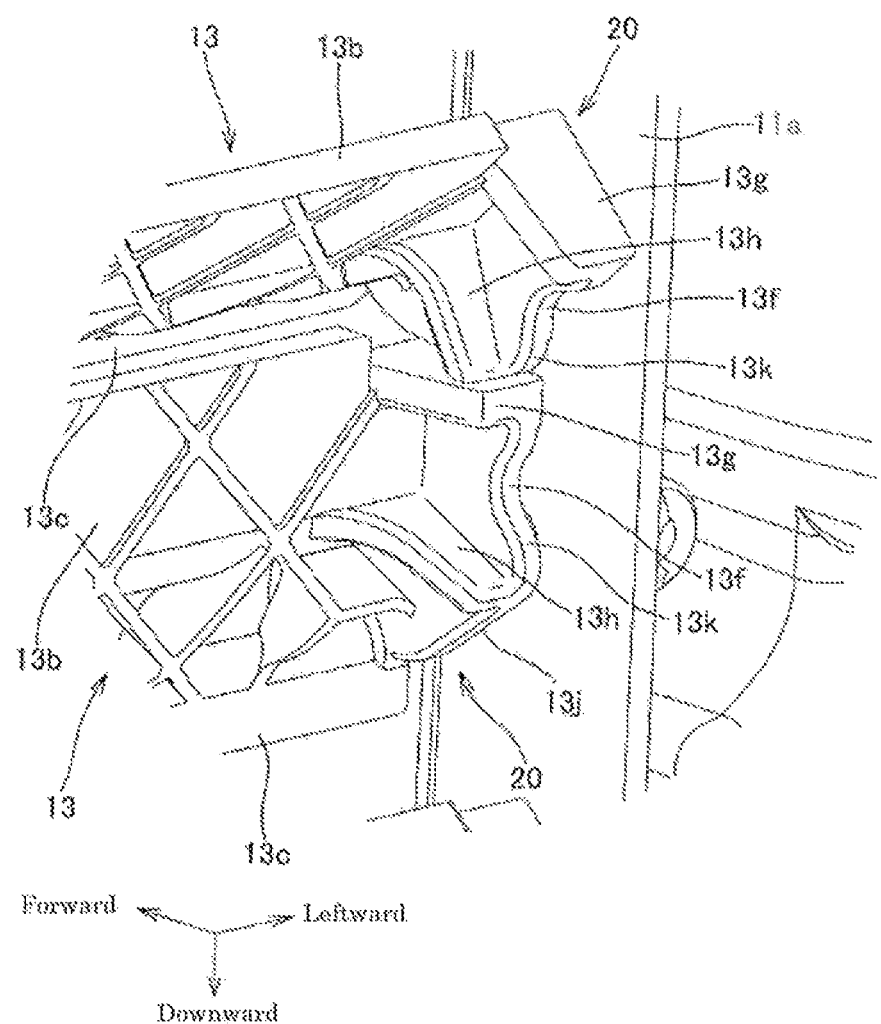

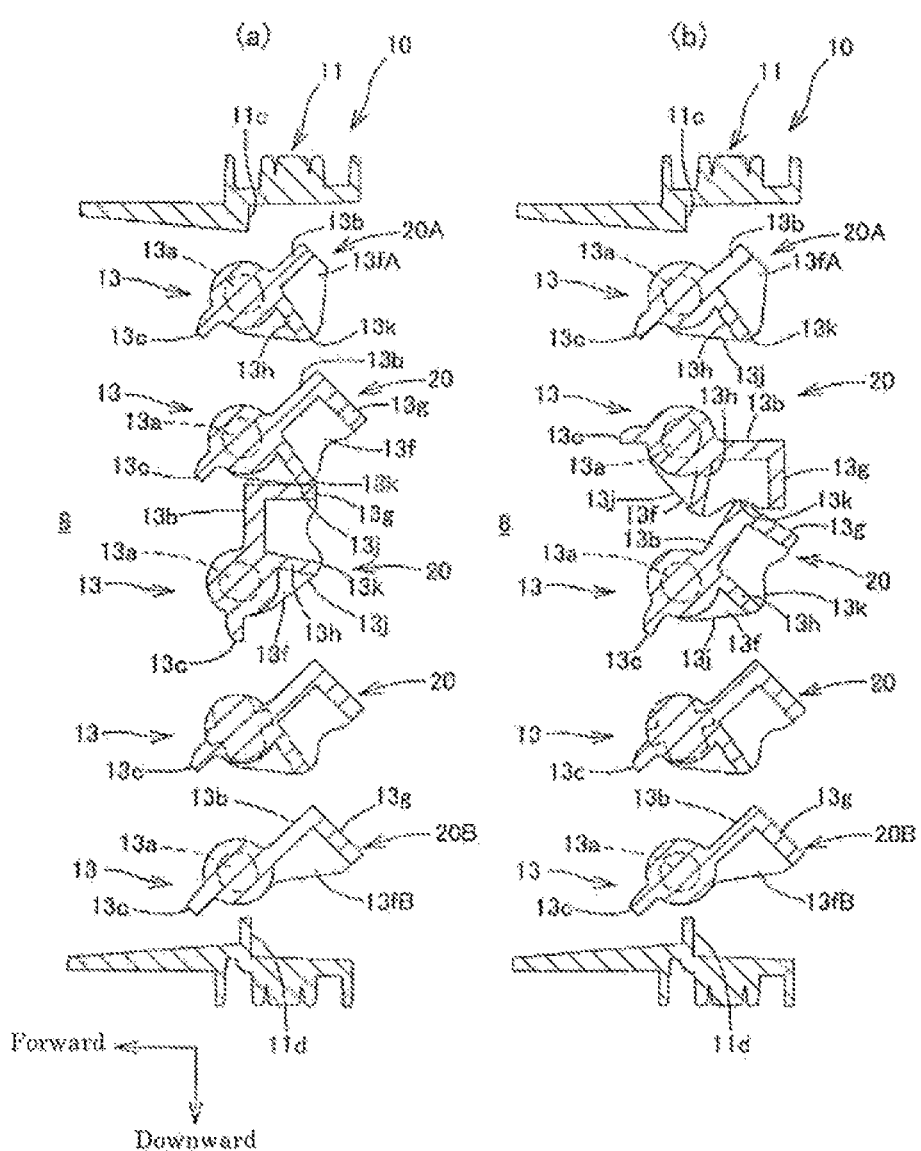
[Fig. 12]

VEHICLE SHUTTER

TECHNICAL FIELD

The present invention relates to a vehicle shutter that is capable of opening and closing an outside air introduction path for introducing outside air into an engine compartment.

BACKGROUND ART

Generally, a radiator is placed in the front part of a vehicle so that cooling water is cooled with outside air introduced into an engine compartment and an engine is cooled to an appropriate temperature with the cooling water. Further, in order to improve the warm-up performance and prevent combustion failure caused by excessive cooling of an engine with cooling water, there has also been widely put to practical use a configuration in which a vehicle shutter that is capable of opening and closing an outside air introduction path for introducing outside air into an engine compartment as needed is provided so that the cooling temperature of cooling water by a radiator can be adjusted.

Normally, as the vehicle shutter, there is employed one that is provided with a plurality of flaps each of which is supported so as to be freely turnable around a horizontal axis, a linkage section which openably and closably links the flaps with each other, and a drive section which drives the flaps to be open and closed through the linkage section. Further, there has also been proposed a vehicle shutter that is provided with a detection section which detects the load of the drive section so that when the load of the drive section increases, for example, due to adhesion of a flap or a foreign matter being caught by a flap, the abnormality is notified to a user (see Patent Document 1, for example).

CITATION LIST

Patent Literature

Patent Document 1: JP-A No. 2012-197001

SUMMARY OF INVENTION

Technical Problem

However, also in the invention described in Patent Document 1, the occurrence of the following problems is of concern. Specifically, when an intermediate part of a power transmission path from the drive section to the flaps is broken, although some of the flaps normally operate to be open or closed, the rest of the flaps may be held in a closed state due to cut off of power transmission thereto. As a result, the cooling performance of a radiator is deteriorated, which causes problems such as seizure and heat deterioration of an engine.

It is an object of the present invention to provide a vehicle shutter that is capable of detecting a flap to which power transmission is cut off by providing a turn restriction unit having a simple structure in each flap.

Solution to Problem

A vehicle shutter according to an aspect of the present invention is capable of opening and closing an outside air introduction path for introducing outside air into an engine compartment. The vehicle shutter is provided with: a plurality of flaps capable of opening and closing the outside air introduction path, the flaps being arranged vertically in parallel to each other so as to cross the outside air introduction path and each being freely turnable around an axis crossing the outside air introduction path; a linkage operation section linking the flaps with each other to perform an opening/closing operation of the flaps; a drive section driving the flaps to be open and closed through the linkage operation section; an abnormality detection section detecting an abnormality of the flaps on the basis of an operating state of the drive section; and an abnormality notification section notifying the abnormality to a user on the basis of output from the abnormality detection section, wherein turn restriction units are formed on adjacent ones of the flaps, the turn restriction units restricting, when power transmission to one of the adjacent flaps from the drive section is cut off, the other one of the adjacent flaps from turning.

In the vehicle shutter, when adhesion of a flap occurs or a foreign matter is caught by a flap, the operation abnormality of the flap is detected by the abnormality detection section on the basis of an operating state of the drive section, and notified to a user by the abnormality notification section. Specifically, an increase in the load of the drive section at the time of opening/closing of the flaps can be detected on the basis of, for example, an excessive current supplied to the motor to thereby detect the abnormality of the flaps, and the detected abnormality can be notified to a user. Further, the turn restriction units are formed on two adjacent flaps so that when power transmission to one of the flaps from the drive section is cut off, the other flap is restricted from turning. Therefore, for example, even when a shaft member, a link, or the like is broken in the power transmission path to the flaps and power transmission to some of the flaps is thereby cut off, flaps that are adjacent to the flaps to which power transmission is cut off (hereinbelow, also referred to as "power-cut flap(s)") are restricted from turning by the turn restriction units of the power-cut flaps. Therefore, as with the case where adhesion of a flap occurs or a foreign matter is caught by a flap, the turn failure of the power-cut flaps can be detected by the abnormality detection section, and notified to a user by the abnormality notification section.

Further, opening failure detecting restriction units restricting, when power transmission to the one flap from the drive section is cut off and the one flap is held in a closed attitude, the other flap from turning to an open attitude may be provided as the turn restriction units. In this case, by notifying a user that the power-cut flap is held in the closed attitude, it is possible to prevent the occurrence of seizure and heat deterioration of the engine.

Further, closing failure detecting restriction units restricting, when power transmission to the one flap from the drive section is cut off and the one flap is held in an open attitude, the other flap from turning to a closed attitude may be provided as the turn restriction units. In this case, by notifying a user that the power-cut flap is held in the open attitude, it is possible to prevent the occurrence of excessive cooling of the engine.

Advantageous Effects of Invention

According to the vehicle shutter according to an aspect of the present invention, when adhesion of a flap occurs or a foreign matter is caught by a flap, the operation abnormality of the flap is detected by the abnormality detection section on the basis of an operating state of the drive section, and notified to a user by the abnormality notification section. Specifically, an increase in the load of the drive section at the time of opening/closing of the flaps can be detected on the basis of, for example, an excessive current supplied to the motor to thereby detect the abnormality of the flaps, and the detected abnormality can be notified to a user. Further, the turn restriction units are formed on two adjacent flaps so that when power transmission to one of the flaps from the drive section is cut off, the other flap is restricted from turning. Therefore, for example, even when a shaft member, a link, or the like is broken in the power transmission path to the flaps and power transmission to some of the flaps is thereby cut off, flaps that are adjacent to the power-cut flaps are restricted from turning by the turn restriction units of the power-cut flaps. Therefore, as with the case where adhesion of a flap occurs or a foreign matter is caught by a flap, the turn failure of the power-cut flaps can be detected by the abnormality detection section, and notified to a user by the abnormality notification section.

BRIEF DESCRIPTION OF DRAWINGS

FIG. 1 is a longitudinal sectional view of the front part of a vehicle near a shutter device, FIG. 2 is a block diagram of a control system of the shutter device;

FIG. 3 is a perspective view of the shutter device;

FIG. 4 is a front view of the shutter device in a state where a duct member is removed therefrom;

FIG. 5 is a perspective view of a flap on the left side;

FIG. 6(a) is a longitudinal sectional view of flaps in a closed attitude, and FIG. 6(b) is a longitudinal sectional view of the flaps in an open attitude;

FIG. 7 is a perspective view of the main part of a linkage operation section in a state where a support frame is omitted;

FIG. 8 is a cross-sectional view taken along line VIII-VIII of FIG. 7;

FIG. 9(a) is a longitudinal sectional view taken along line IX-IX of FIG. 4 when the flaps are in the closed attitude, and FIG. 9(b) is a longitudinal sectional view taken along line IX-IX of FIG. 4 when the flaps are in the open attitude;

FIG. 10 is a perspective view of the main part of the shutter device including turn restriction units of flaps on the left side and the vicinity thereof when, while a flap located in the central part in the height direction is held in the closed attitude, the other flaps are about to turn to the open attitude;

FIG. 11 is a perspective view of the main part of the turn restriction units of the flaps on the left side in the same state as illustrated in FIG. 10; and FIG. 12(a) is a cross-sectional view taken along line XII-XII of FIG. 10 in the same state as illustrated in FIG. 10, and FIG. 12(b) is a cross-sectional view taken along line XII-XII of FIG. 10 when, while a flap located in the central part in the height direction is held in the open attitude, the other flaps are about to turn to the closed attitude.

DESCRIPTION OF EMBODIMENTS

Hereinbelow, an embodiment of the present invention will be described with reference to the drawings.

First, the structure of the front part of a motor vehicle will be described. As illustrated in FIG. 1, the front surface of the motor vehicle is covered by a front bumper face 1. Openings 2 and 3 each of which extends in the vehicle width direction are respectively formed on the upper part and the lower part of the front bumper face 1. While the motor vehicle is travelling, travelling wind is introduced into an engine compartment 6 through the openings 2 and 3. A bumper reinforcement 4 which extends in the vehicle width direction and has a closed sectional shape is provided behind the front bumper face 1. An impact absorber 5 is provided on the front side of the bumper reinforcement 4 throughout the entire length thereof. Accordingly, impact at the time of a head-on collision is absorbed by the impact absorber 5 and the bumper reinforcement 4. Behind the bumper reinforcement 4, a radiator 7 is arranged inside an engine compartment 6. A shutter device 10 which can open and close an outside air introduction path 8 extending from the lower opening 3 to the radiator 7 is provided below the bumper reinforcement 4.

As illustrated in FIGS. 1 to 4, the shutter device 10 is provided with: a square tubular casing 11; a square tubular duct member 12 which communicates with and is fixed to the casing 11, and extends toward the lower opening 3 of the front bumper face 1; a plurality of flaps 13 each of which turns around a horizontal turning center C crossing the outside air introduction path 8 inside the casing 11 so as to be able to open and close the outside air introduction path 8; a linkage operation section 14 which links the flaps 13 with each other to perform an opening/closing operation of the flaps; a drive section 15 which drives the flaps 13 to be open and closed through the linkage operation section 14; and a control section 16 which controls the drive section 15.

As illustrated FIGS. 1 to 6, five of the flaps 13 are arranged vertically in parallel to each other in each of the right part and the left part of the casing 11. Each of the flaps 13 is freely turnable around the corresponding turning center C. Each of the left and right flaps 13 is integrally molded by injection molding or the like using a synthetic resin material. The left and right flaps 13 are mirror symmetrical to each other. In the present embodiment, two groups each including five flaps 13 are arranged in the right part and the left part of the casing 11. However, the number of flaps 13 in each group can be set to any number as long as it is more than one. Also, the number of groups of flaps 13 arranged inside the casing 11 can be one or three or more.

Right and left shafts 13a projecting outward are provided on both ends of each of the flaps 13 so as to correspond to the turning center C thereof. The left ends of the five left flaps 13 are freely turnably supported on the casing 11 by fitting the left shafts 13a with a left wall 11a of the casing 11. The right ends of the five right flaps 13 are freely turnably supported on the casing 11 by fitting the right shafts 13a with a right wall 11b of the casing 11. The linkage operation section 14 is provided in the central part in the vehicle width direction of the casing 11. The right ends of the five left flaps 13 and the left ends of the five right flaps 13 are connected to and supported by the linkage operation section 14.

Each of the flaps 13 is provided with a main wing plate 13b and an auxiliary wing plate 13c which extend toward both outer sides approximately in the radial direction from the turning center C. Each of the flaps 13 is turnably supported on the casing 11 between an open attitude illustrated in FIG. 6(b) in which both of the wing plates 13b and 13c are arranged within a generally horizontal plane with the auxiliary wing plate 13c located at the front side and a closed attitude illustrated in FIG. 6(a) in which both of the wing plates 13b and 13c are arranged within a generally vertical plane with the main wing plate 13b located at the upper side.

Here, the linkage operation section 14 will be described. As illustrated in FIGS. 3, 4, and 7 to 9(b), a vertically elongated support frame 17 which connects an upper wall and a lower wall of the casing 11 to each other and has a generally U-shaped cross section is provided approximately on the center in the vehicle width direction of the casing 11 with its opening facing backward. An operation member 18 which has a generally U-shaped cross section is vertically provided behind the support frame 17 so as to be combined with the support frame 17 with its opening facing forward. The support frame 17 and the casing 11 can be composed of an integrally molded article, or can also be composed of separate members. The right ends of the five left flaps 13 are freely turnably supported on the support frame 17 by fitting the right shafts 13*a* with a left wall 17*a* of the support frame 17. The left ends of the five right flaps 13 are freely turnably supported on the support frame 17 by fitting the left shafts 13*a* with a right wall 17*b* of the support frame 17. Support pieces 13*d* each of which projects backward in the closed attitude are formed in a standing manner on the right ends of the main wing plates 13*b* of the five left flaps 13 and the left ends of the main wing plates 13*b* of the five right flaps 13. Operation pins 13*e* are formed in a projecting manner on the respective support pieces 13*d* substantially in parallel to the respective shafts 13*a*. The operation pins 13*e* of the five left flaps 13 are freely rotatably fitted with a left wall 18*a* of the operation member 18. The operation pins 13*e* of the five right flaps 13 are freely rotatably fitted with a right wall 18*b* of the operation member 18. In the five left flaps 13, the second flap 13 from the bottom is connected to the drive section 15 which includes a motor 25 including a brushless DC motor, a DC motor with brush, a stepping motor, and the like. When the second flap 13 from the bottom is operated to turn by the drive section 15, and the operation pin 13*e* thereof turns upward around the shaft 13*a* of this flap 13 as illustrated in FIG. 9(*a*), the operation member 18 moves upward. Accordingly, the operation pins 13*e* of the other flaps 13 move upward, and the other flaps 13 are also linked and operated to the closed attitude. On the other hand, when the operation pin 13*e* of the second flap 13 from the bottom turns downward around the shaft 13*a* thereof as illustrated in FIG. 9(*b*), the operation member 18 moves downward. Accordingly, the operation pins 13*e* of the other flaps 13 move downward, and the other flaps 13 are also linked and operated to the open attitude. However, a flap 13 to be operated to turn by the drive section 15 can be set to any flap 13. Further, as the linkage operation section 14, one having a configuration other than the configuration described above can also be employed.

As illustrated in FIGS. 6(*a*) and 6(*b*), a gravity center position G of each of the flaps 13 is constantly arranged behind the turning center C thereof within a turning range between the closed attitude and the open attitude so that operation force to the open attitude constantly acts on the flap 13 by gravity. Specifically, a plane including the center in the thickness direction of the main wing plate 13*b* of each of the flaps 13 is arranged at a position that is separated from a plane passing through the turning center C by a certain distance t. A plane including the center in the thickness direction of the auxiliary wing plate 13*c* is arranged within a plane passing through the turning center C. A length L1 of the main wing plate 13*b* from the turning center C is set to be longer than a length L2 of the auxiliary wing plate 13*c* from the turning center C. The gravity center position G of the flap 13 is set so that operation force to the open attitude acts on the flap 13 by gravity. Therefore, operation force to the open attitude acts by gravity also in the closed attitude in which the main wing plate 13*b* is vertically arranged above the turning center C. However, as each of the flaps 13, one having any configuration can be employed as long as the gravity center position G thereof is set so that gravity to the open attitude constantly acts in the turning range between the closed attitude and the open attitude. For example, although when the main wing plate 13*b* and the auxiliary wing plate 13*c* are configured to have the same size, and both of the wing plates 13*b* and 13*c* are arranged within the same plane, it is also possible to form a weight portion or the like on the main wing plate 13*b* and adjust the gravity center position G of the flap 13 so that gravity to the open attitude acts by virtue of the weight portion.

Further, as illustrated in FIG. 6(*a*), in the closed attitude, the upper end of a main wing plate 13*b* is arranged so as to be overlapped with the back surface of an auxiliary wing plate 13*c* of a flap 13 that is adjacent thereto on the upper side by a predetermined height. In this state, a height H1 of an exposed surface on the front surface of the main wing plate 13*b* is configured to be larger than a height H2 of an exposed surface on the front surface of the auxiliary wing plate 13*c*, the exposed surfaces being exposed on the front side of the flap 13. Accordingly, the pressure receiving area for receiving the wind pressure of outside air that is introduced into the engine compartment 6 through the outside air introduction path 8 is made larger in the main wing plate 13*b* than the auxiliary wing plate 13*c*. As a result, operation force to the open attitude acts on each of the flaps 13 by virtue of travelling wind.

In the shutter device 10, the gravity center position G of each of the flaps 13 and the pressure receiving area for receiving the wind pressure on the main wing plate 13*b* and the auxiliary wing plate 13*c* of each of the flaps 13 in the closed attitude are appropriately set. Therefore, even when power transmission to some of the flaps 13 is cut off, for example, due to breakage of the operation pins 13*e* thereof and power to the power-cut flaps 13 is thereby idling, it is possible to forcibly cause the power-cut flaps 13 to turn to the open attitude by their own weight or travelling wind so as to be held in the open attitude. As a result, it is possible to prevent an abnormal increase in the cooling water temperature. However, when some of the flaps 13 are held in the open attitude, the cooling water temperature may decrease, and the engine performance may be thereby deteriorated. Further, the power-cut flaps 13 may not turn to the open attitude by their own weight or travelling wind due to some reasons and remain held in the closed attitude, which may increase the cooling water temperature. Therefore, in the shutter device 10, a turn restriction unit 20 is formed in each of the flaps 13. Accordingly, even in the case where power transmission to some of the flaps 13 is cut off and power to the power-cut flaps 13 is thereby idling, when flaps 13 adjacent to the power-cut flaps 13 are normally operating, the normally-operating flaps 13 are restricted from turning by the turn restriction units 20 of the power-cut flaps 13 to thereby increase the load of the drive section 15. As a result, the operation abnormality of the flaps 13 can be detected by the control section 16, and promptly notified to a driver.

Specifically, the turn restriction units 20 having the following configuration are formed on the left ends of the left flaps 13 and the right ends of the right flaps 13. Since the left and right turn restriction units 20 are mirror symmetrical to each other, the turn restriction units 20 of the left flaps 13 will be described.

In the five flaps 13 arranged vertically in parallel to each other, turn restriction units 20 of three flaps 13 located in the central part will be described. As illustrated in FIGS. 5 and 10 to 12(*b*), a projection piece 13*f* which projects backward in the closed attitude is formed on the left end of the main wing plate 13*b* of each of the left flaps 13. Further, a plate-like abutment piece 13*g* is formed from the upper end of the main wing plate 13*b* in the closed attitude (the end at the side separated from the turning center C of the main wing plate 13*b*) through the upper end of the projection piece 13*f*. Further, a reinforcement rib 13*h* which prevents the projection piece 13*f* from falling down inward is formed from an intermediate part in the height direction of the main wing plate 13*b* in the closed attitude through the projection piece 13*f*. Further, an opening failure detecting restriction unit 13*j* and a closing failure detecting restriction unit 13*k* each of which can abut on the abutment piece 13*g* of a flap 13 that is adjacent thereto on the lower side are formed on the projection piece 13*f*.

As illustrated in FIG. 12(*a*), when power transmission to some (or one) of the flaps 13 (the third flap 13 from the bottom in FIG. 12(*a*)) is cut off and the power-cut flap 13 is thereby held in the closed attitude, the opening failure detecting restriction unit 13*j* of a flap 13 that is adjacent to the power-cut flap 13 on the upper side (the fourth flap 13 from the bottom in FIG. 12(*a*)) abuts on the abutment piece 13*g* of the power-cut flap 13, so that the adjacent flap 13 on the upper side is restricted from turning to the open attitude. Further, flaps 13 other than the adjacent flap 13 on the upper side (the first, second, and fifth flaps 13 from the bottom in FIG. 12(*a*)) are also restricted from turning to the open attitude by being linked with the adjacent flap 13 on the upper side by the linkage operation section 14. Further, as illustrated in FIG. 12(*b*), when power transmission to some (or one) of the flaps 13 (the fourth flap 13 from the bottom in FIG. 12(*b*)) is cut off and the power-cut flap 13 is thereby held in the open attitude, the abutment piece 13*g* of a flap 13 that is adjacent to the power-cut flap 13 on the lower side (the third flap 13 from the bottom in FIG. 12(*b*)) abuts on the closing failure detecting restriction unit 13*k* of the power-cut flap 13, so that the adjacent flap 13 on the lower side (the third flap 13 from the bottom) is restricted from turning to the closed attitude. Further, flaps 13 other than the adjacent flap 13 on the lower side (the first, second, and fifth flaps 13) are also restricted from turning to the closed attitude by being linked with the adjacent flap 13 on the lower side by the linkage operation section 14.

Further, a turn restriction unit 20A is provided on the left end of the main wing plate 13*b* of the uppermost flap 13. The turn restriction unit 20A is provided with the opening failure detecting restriction unit 13*j* and the closing failure detecting restriction unit 13*k* each of which is the same as that in the above turn restriction unit 20, a projection piece 13*f*A in which the upper part of the projection piece 13*f* of the above turn restriction unit 20 in the open attitude (the part at the side separated from the turning center C of the main wing plate 13*b*) is omitted, and the reinforcement rib 13*h*. In the turn restriction unit 20A, the abutment piece 13*g* is omitted. Further, a turn restriction unit 20B is provided on the left end of the main wing plate 13*b* of the lowermost flap 13. In the turn restriction unit 20B, the opening failure detecting restriction unit 13*j* and the closing failure detecting restriction unit 13*k* in the above turn restriction unit 20 are omitted. The turn restriction unit 20B is provided with a projection piece 13*f*B in which the lower part of the projection piece 13*f* of the above turn restriction unit 20 in the open attitude (the part at the side of the turning center C of the main wing plate 13*b*) is omitted, the reinforcement rib 13*h*, and the abutment piece 13*g*. That is, since no flap 13 is arranged above the uppermost flap 13, the abutment piece 13*g* is not required. Further, since no flap 13 is arranged below the lowermost flap 13, it is not necessary to provide the opening failure detecting restriction unit 13*j* and the closing failure detecting restriction unit 13*k*. Therefore, as described above, by changing the configuration of the turn restriction unit between the turn restriction unit 20 of each of the three flaps 13 located on the central part and the turn restriction units 20A and 20B of the uppermost and lower most flaps 13, the weight of the flaps 13 can be reduced as far as possible.

As illustrated in FIG. 2, the control section 16 controls the motor 25 on the basis of a signal from a water temperature sensor 30 which detects the temperature of cooling water for cooling the engine, a pulse signal from an encoder 31 which is attached to the motor 25, and output from a current value detection section 32 (corresponding to an abnormality detection section) which detects the value of current to the motor 25. Further, when an abnormality of the shutter device 10 is detected on the basis of output from the current value detection section 32, a warning is given to a driver by an abnormality notification section 33 using an alarm sound or an alarm display. However, as a method for controlling the shutter device 10 performed by the control section 16, a control method other than the method described below can also be employed.

Here, control of the shutter device 10 performed by the control section 16 will be described. First, when an ignition switch 34 is turned ON, the motor 25 is driven to operate the flaps 13 to turn to the closed attitude in order to perform calibration processing for setting initial positions of the flaps 13. At this point, the current value detection section 32 sequentially detects current values from the motor 25, and the control section 16 determines whether or not the detected current value has become larger than a previously set predetermined threshold. While the flaps 13 are turning, since the detected current value is smaller than the threshold, energization to the motor 25 is continued. However, as illustrated in FIG. 6(*a*), when the end of the main wing plate 13*b* of the uppermost slap 13 and the end of the auxiliary wing plate 13*c* of the lowermost flap 13 respectively abut on the restriction projections 11*c*, 11*d* formed on the casing 11 and the flaps 13 are held in the closed attitude, the load of the motor 25 increases and the value of current to the motor 25 thereby increases. Then, when the current value at this point becomes higher than the previously set predetermined threshold, energization to the motor 25 is cut off. Thereafter, in the control section 16, the flaps 13 are caused to turn to the open attitude by the motor 25 while sequentially detecting the rotation angle of the rotation shaft of the motor 25 on the basis of output from the encoder 31. The flaps 13 are caused to turn by approximately 90° so as to be held in the open attitude on the basis of output from the encoder 31, and the positions of the flaps 13 at this point are stored as initial positions. Although the initial position of each of the flaps 13 is set at an angle of approximately 90° from the closed attitude toward the open attitude, the initial position can be set to another angle, for example, an angle that allows introduced outside air to flow toward the radiator 7.

After setting the initial positions of the flaps 13 in this manner, on the basis of output from the water temperature sensor 30, the flaps 13 are caused to turn to the open attitude when the temperature of cooling water is high and the flaps 13 are caused to turn to the closed attitude when the temperature of cooling water is low so that the temperature of cooling water to the engine is maintained at an appropriate temperature. In this manner, the warm-up performance is improved, and combustion failure caused by excessive cooling of the engine with cooling water is prevented.

On the other hand, when a flying stone or the like is caught in a flap 13, and the flap 13 thereby cannot turn or the turning range thereof is thereby restricted, the value of current to the motor 25 detected by the current value detection section 32 becomes higher than the threshold in the middle of the turn to the closed attitude or the open attitude during calibration or operation of the flaps 13.

Therefore, the operation abnormality of the flap 13 is detected on the basis of output from the current value detection section 32, and notified to a driver by the abnormality notification section 33. Further, when power transmission to some of the flaps 13 is cut off and power to the power-cut flaps 13 is idling, the operation abnormality of the flaps 13 cannot be detected on the basis of only output from the current value detection section 32 in a conventional shutter device 10. However, in the shutter device 10 of the present invention, it is possible to prevent the temperature of cooling water from becoming abnormally high since the flaps 13 turn to the open attitude by gravity or wind power. In addition, as illustrated in FIG. 12(b), at least in flaps 13 other than the lowermost flap 13, when power transmission to a flap 13 (the fourth flap from the bottom in FIG. 12(b)) is cut off, the abutment piece 13g of the turn restriction unit 20 of a flap 13 (the third flap 13 from the bottom in FIG. 12(b)) that is located just below the power-cut flap 13 abuts on the closing failure detecting restriction unit 13k of the turn restriction unit 20 of the power-cut flap 13, and the flap 13 located just below the power-cut flap 13 is thereby restricted from turning to the closed attitude. Then, since the flap 13 (the third flap 13 from the bottom in FIG. 12(b)) located just below the power-cut flap 13 is restricted from turning in this manner, output from the current value detection section 32 becomes higher than the threshold. Therefore, the operation failure of the flaps 13 can be detected, and notified to a driver. Further, even if a flap 13 should not turn to the open attitude by gravity or wind power, as illustrated in FIG. 12(a), at least in flaps 13 other than the uppermost flap 13, when power transmission to a flap 13 (the third flap from the bottom in FIG. 12(a)) is cut off, the opening failure detecting restriction unit 13j of a flap 13 (the fourth flap 13 from the bottom in FIG. 12(a)) that is located just above the power-cut flap 13 abuts on the abutment piece 13g of the turn restriction unit 20 of the power-cut flap 13, and the flap 13 located just above the power-cut flap 13 is thereby restricted from turning to the open attitude. Then, since the flap 13 (the fourth flap 13 from the bottom in FIG. 12(a)) located just above the power-cut flap 13 is restricted from turning in this manner, output from the current value detection section 32 becomes higher than the threshold. Therefore, the operation failure of the flaps 13 can be detected, and notified to a driver.

In the shutter device 10, the gravity center position G of each of the flaps 13 is set so that operation force to the open attitude acts on the flaps 13 by gravity in this manner. Therefore, even when a power transmission path from the drive section 15 to a flap 13 is broken, the power-cut flap 13 turns to the open attitude by its own weight. Therefore, the occurrence of problems such as seizure and heat deterioration of the engine caused by the power-cut flap 13 being held in the closed attitude can be prevented. Further, even when the power-cut flap 13 does not turn to the open attitude by its own weight, it is possible to forcibly operate the power-cut flap 13 to turn to the open attitude by the pressure of travelling wind. Therefore, the operation stability of the flaps 13 to the open attitude when power transmission is cut off can be improved. Further, by providing the rotation restriction unit 20 in each of the flaps 13, a flap 13 that is adjacent to the power-cut flap 13 is restricted from turning to the open attitude or the closed attitude. Accordingly, the operation abnormality of the flap 13 can be detected and notified to a driver. As a result, it is possible to promptly perform repair of the flap 13. Further, even if the power-cut flap 13 should not turn to the open attitude by its own weight or the pressure of wind, a driver can grasp the operation abnormality of the flap 13. Therefore, it is possible to prevent the temperature of cooling water from abnormally increasing.

When operation abnormalities of the flaps 13 are detected by providing the turn restriction units 20 as described in the above embodiment, it is not always necessary to appropriately set the gravity center position G of each of the flaps 13 and the pressure-receiving area for receiving the wind pressure on the main wing plate 13b and the auxiliary wing plate 13c of each of the flaps 13 in the closed attitude as described above. For example, each flap can also be configured so that the gravity center position of the flap coincides with the rotation center position thereof.

Although the embodiment of the present invention has been described in the above, it is needless to say that the present invention is not limited at all to the above embodiment, and the configuration thereof can be modified without departing from the scope of the invention.

REFERENCE SIGNS LIST

1 Front bumper face
2 Opening
3 Lower opening
4 Bumper reinforcement
5 Impact absorber
6 Engine compartment
7 Radiator
8 Outside air introduction path
10 Shutter device
11 Casing
11a Left wall
11b Right wall
11e Restriction projection
11d Restriction projection
12 Duct member
13 Flap
13a Shaft
13b Main wing plate
13c Auxiliary wing plate
13d Support piece
13e Operation pin
13f Projection piece
13fA Projection piece
13fB Projection piece
13g Abutment piece
13h Reinforcement rib
13j Opening failure detecting restriction unit
13k Closing failure detecting restriction unit
14 Linkage operation section
15 Drive section
16 Control section
17 Support frame
17a Left wall
17b Right wall
18 Operation member
18a Left wall
18b Right wall
20 Turn restriction unit
20A Turn restriction unit
20B Turn restriction unit
25 Motor
30 Water temperature sensor
31 Encoder
32 Current value detection section
33 Abnormality notification section
34 Ignition switch

The invention claimed is:

1. A vehicle shutter capable of opening and closing an outside air introduction path for introducing outside air into an engine compartment, the vehicle shutter comprising:
   a plurality of flaps capable of opening and closing the outside air introduction path, the flaps being arranged in parallel to each other and each of the flaps being freely turnable around an axis thereof;
   a linkage having an elongated support frame linking the flaps with each other to perform an opening/closing operation of the flaps;
   a motor driving the flaps to be open and closed through the linkage;
   an abnormality detector detecting an abnormality of the flaps on the basis of an operating state of the motor; and
   an abnormality notifier notifying the abnormality to a user on the basis of output from the abnormality detector,
   wherein a turn restrictor is formed on one end of each of the flaps, to project backward when the flaps are in a closed attitude,
   wherein when the flaps include a first flap that is incapable of being opened and closed due to cut off of power transmission to the first flap from the motor, the turn restrictor formed on each of the flaps is arranged so that the turn restrictor of the first flap comes into contact with one of the turn restrictor of a second flap adjacent to an upper side of the first flap and the turn restrictor of a third flap adjacent to a lower side of the first flap, to restrict the second flap or the third flap, which is in contact with the turn restrictor of the first flap, from turning that is induced by power transmission from the motor,
   wherein the abnormality detector detects a failure in turning of the first flap, based on the operating state of the motor upon the second flap or the third flap being restricted from turning by the turn restrictor of the first flap, and
   wherein the turn restrictor includes an opening restrictor for restricting the second flap adjacent to the upper side of the first flap from turning to an open attitude, when the first flap to which power transmission has been cut off is held in the closed attitude.

2. A vehicle shutter capable of opening and closing an outside air introduction path for introducing outside air into an engine compartment, the vehicle shutter comprising:
   a plurality of flaps capable of opening and closing the outside air introduction path, the flaps being arranged in parallel to each other and each of the flaps being freely turnable around an axis thereof;
   a linkage having an elongated support frame linking the flaps with each other to perform an opening/closing operation of the flaps;
   a motor driving the flaps to be open and closed through the linkage;
   an abnormality detector detecting an abnormality of the flaps on the basis of an operating state of the motor; and
   an abnormality notifier notifying the abnormality to a user on the basis of output from the abnormality detector,
   wherein a turn restrictor is formed on one end of each of the flaps, to project backward when the flaps are in a closed attitude,
   wherein when the flaps include a first flap that is incapable of being opened and closed due to cut off of power transmission to the first flap from the motor, the turn restrictor formed on each of the flaps is arranged so that the turn restrictor of the first flap comes into contact with one of the turn restrictor of a second flap adjacent to an upper side of the first flap and the turn restrictor of a third flap adjacent to a lower side of the first flap, to restrict the second flap or the third flap, which is in contact with the turn restrictor of the first flap, from turning that is induced by power transmission from the motor,
   wherein the abnormality detector detects a failure in turning of the first flap, based on the operating state of the motor upon the second flap or the third flap being restricted from turning by the turn restrictor of the first flap, and
   wherein the turn restrictor includes a closing restrictor for restricting the third flap adjacent to the lower side of the first flap from turning to a close attitude, when the first flap to which power transmission has been cut off is held in an open attitude.

3. A vehicle shutter capable of opening and closing an outside air introduction path for introducing outside air into an engine compartment, the vehicle shutter comprising:
   a plurality of flaps capable of opening and closing the outside air introduction path, the flaps being arranged in parallel to each other and each of the flaps being freely turnable around an axis thereof;
   a linkage having an elongated support frame linking the flaps with each other to perform an opening/closing operation of the flaps;
   a motor driving the flaps to be open and closed through the linkage;
   an abnormality detector detecting an abnormality of the flaps on the basis of an operating state of the motor; and
   an abnormality notifier notifying the abnormality to a user on the basis of output from the abnormality detector,
   wherein a turn restrictor is formed on one end of each of the flaps, to project backward when the flaps are in a closed attitude,
   wherein when the flaps include a first flap that is incapable of being opened and closed due to cut off of power transmission to the first flap from the motor, the turn restrictor formed on each of the flaps is arranged so that the turn restrictor of the first flap comes into contact with one of the turn restrictor of a second flap adjacent to an upper side of the first flap and the turn restrictor of a third flap adjacent to a lower side of the first flap, to restrict the second flap or the third flap, which is in contact with the turn restrictor of the first flap, from turning that is induced by power transmission from the motor,
   wherein the abnormality detector detects a failure in turning of the first flap, based on the operating state of the motor upon the second flap or the third flap being restricted from turning by the turn restrictor of the first flap,
   wherein the turn restrictor includes an opening restrictor for restricting the second flap adjacent to the upper side of the first flap from turning to an open attitude, when the first flap to which power transmission has been cut off is held in the closed attitude, and
   wherein the turn restrictor includes, in addition to the opening restrictor, a closing restrictor for restricting the third flap adjacent to the lower side of the first flap from turning to the closed attitude, when the first flap to which power transmission has been cut off is held in an open attitude.

4. The vehicle shutter according to claim 1, wherein the elongated support frame turnably supports the flaps and links the flaps with each other to perform the opening/closing operation of the flaps.

5. The vehicle shutter according to claim 2, wherein
the abnormality detector detects a value of current to the motor to detect the abnormality of the flaps on the basis of the operating state of the motor.
6. The vehicle shutter according to claim 3, wherein
the abnormality notifier uses an alarm to notify the abnormality to a user on the basis of output from the abnormality detector, and
the turn restrictor has a projection piece to project backward when the flaps are in the closed attitude.

* * * * *